United States Patent
Schafer, Jr.

(10) Patent No.: US 12,304,291 B2
(45) Date of Patent: May 20, 2025

(54) VEHICLE WITH A ROOF RACK SYSTEM UNDER A SOFT OR REMOVABLE ROOF

(71) Applicant: George J. Schafer, Jr., Pennington, NJ (US)

(72) Inventor: George J. Schafer, Jr., Pennington, NJ (US)

(*) Notice: Subject to any disclaimer, the term of this patent is extended or adjusted under 35 U.S.C. 154(b) by 0 days.

(21) Appl. No.: 18/415,329

(22) Filed: Jan. 17, 2024

(65) Prior Publication Data

US 2024/0149651 A1     May 9, 2024

Related U.S. Application Data

(63) Continuation of application No. 17/402,528, filed on Aug. 14, 2021, now abandoned, which is a continuation-in-part of application No. 15/872,226, filed on Jan. 16, 2018, now abandoned.

(60) Provisional application No. 62/446,996, filed on Jan. 17, 2017.

(51) Int. Cl.
*B60J 7/10*     (2006.01)
*B60R 9/058*     (2006.01)

(52) U.S. Cl.
CPC ............... *B60J 7/102* (2013.01); *B60R 9/058* (2013.01)

(58) Field of Classification Search
CPC ........... B60J 7/102; B60R 9/052; B60R 9/058
See application file for complete search history.

(56) References Cited

U.S. PATENT DOCUMENTS

| | | |
|---|---|---|
| 4,538,752 A | 9/1985 | Welter |
| 5,492,259 A | 2/1996 | Tippets |
| 6,152,339 A | 11/2000 | Kreisler |
| D434,718 S | 12/2000 | Kreisler |
| 6,755,332 B2 | 6/2004 | Crane et al. |
| 8,496,146 B2 | 7/2013 | Badillo |
| 8,944,486 B2 | 2/2015 | Donohue |
| 9,187,046 B2 | 11/2015 | Peck |

(Continued)

FOREIGN PATENT DOCUMENTS

| | | |
|---|---|---|
| CA | 2198294 | 8/1997 |
| CN | 203666530 | 6/2014 |
| DE | 3150130 | 6/1983 |

OTHER PUBLICATIONS

Alcobra Metals Inc., Installing Locking Button in Telescoping Tube, YouTube, Published Jul. 29, 2014, available at https://www.youtube.com/watch?v=y3V6o3eca0g (Year: 2014).*

(Continued)

*Primary Examiner* — Kyle A Cook
(74) *Attorney, Agent, or Firm* — LaMorte & Associates PC

(57) ABSTRACT

A vehicle structure with an upper framework that consists of a driver side frame element, a passenger side frame element and possible lateral crossbars. An open area is interposed between the driver side frame element and the passenger side frame element. The vehicle has a roof system to selectively cover and expose the open area. When the roof system is closed, a gap space exists between the open area and the interior of the roof system. Removable mounts are bolted to the upper framework. At least two cargo bars are provided that attach to the mounts. The cargo bars extend across the open area and are supported by the mounts in the gap space under the roof system. In this manner, the roof system can be selectively opened and closed over the cargo bars.

11 Claims, 6 Drawing Sheets

(56) References Cited

U.S. PATENT DOCUMENTS

| | | |
|---|---|---|
| 2005/0092796 A1 | 5/2005 | Essig |
| 2010/0013265 A1* | 1/2010 | Sylkatis ................ B60J 7/1243 |
| | | 181/207 |
| 2010/0073691 A1 | 3/2010 | Rosinski |
| 2011/0101056 A1 | 5/2011 | Barkey |
| 2012/0193380 A1 | 8/2012 | McMurtrie |
| 2014/0069971 A1 | 3/2014 | van Kaathoven |
| 2015/0123422 A1 | 5/2015 | Bennett et al. |
| 2016/0046241 A1 | 2/2016 | Crismon et al. |
| 2016/0046242 A1 | 2/2016 | Peck |
| 2018/0022284 A1 | 1/2018 | Bessette |
| 2018/0118003 A1 | 5/2018 | Singer |
| 2018/0370448 A1 | 12/2018 | Schafer, Jr. |

OTHER PUBLICATIONS

D&t online, Knock Down Fittings, Brackets and Plates, http://wiki.dtonline.org/index.php/Knock_Down_Fittings%2C_Brackets_and_Plates (Year:2016).

Machine Translation of DE3150130A1 (Year: 1983).

Redbeard Offroad, YouTube, https://www.youtube.com/watch?v=bpp6_SYxpZM, Published Sep. 16, 2015 (Year: 2015).

TheKid25, JKForum, https://www.jk-forum.com/forums/jk-show-tell-33/sans-windshield-249295/, Published Aug. 9, 2012 (Year:2012).

* cited by examiner

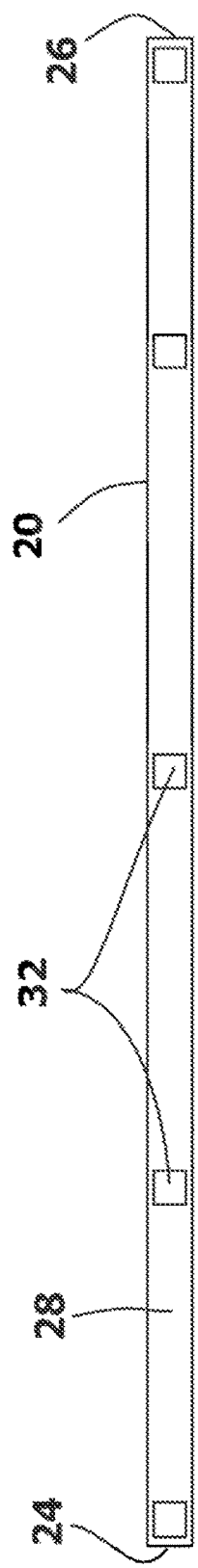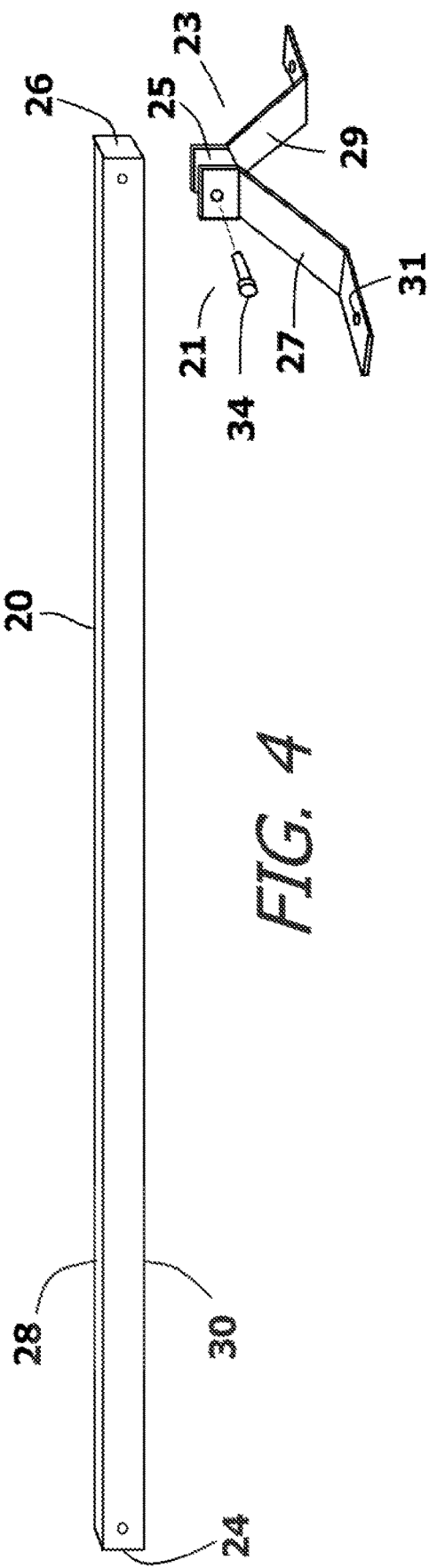

VEHICLE WITH A ROOF RACK SYSTEM UNDER A SOFT OR REMOVABLE ROOF

RELATED APPLICATIONS

This application is a continuation of U.S. patent application Ser. No. 17/402,528 filed Aug. 14, 2021 which is a continuation-in-part of U.S. patent application Ser. No. 15/872,226, filed Jan. 16, 2018, that claims benefit of Provisional Patent Application No. 62/446,996, filed Jan. 17, 2017.

BACKGROUND OF THE INVENTION

1. Field of the Invention

In general, the present invention relates to roof racks and cargo racks that are designed to attach to the roof of a vehicle, such as a sports utility vehicle or a pickup truck. More particularly, the present invention relates to roof racks and cargo racks that attach directly to the frame of a vehicle that has a removable or retractable roof.

2. Prior Art Description

Many vehicles, such as the Jeep® Wrangler®, and Ford® Bronco® have roof systems that are either removable or retractable. This enables the vehicle to be fitted with either a soft top roof, a hard top roof, or a hybrid roof with sliding panels depending upon the preferences of the owner. Since the roof system is removable and/or retractable, it is not integrated into the structural framework of the vehicle. In order to keep the vehicle safe and stable, the vehicle is typically designed with a framework that reinforces the top of the vehicle. The upper framework helps protect the occupants of the vehicle, should the vehicle roll over or be involved in a collision. In addition to providing safety, the framework of the vehicle also serve as anchors and supports to the roofing system.

In such vehicles, a problem occurs when a person attempts to attach a roof rack or some other cargo rack to the top of the vehicle. If the roof rack is attached directly to the upper framework, then the presence of the rack prevents the soft top or hard top from being installed. The vehicle must therefore remain as a convertible for as long as the roof rack is in place. Such prior art systems are exemplified by U.S. Patent Application Publication No. 2012/0193380 to McMurtrie and U.S. Pat. No. 6,152,339 to Kreisler. If the roof rack is installed atop the soft top or hard top, then holes must be formed in the soft top or hard top. This damages the roofing system and promotes leaking and tearing. Such prior art systems are exemplified by U.S. Pat. No. 4,538,752 to Welter.

The only alternative in the prior art is to use an external frame or create brackets that attach to the frame of the vehicle at points around the periphery of the roofing system. Such prior art systems are exemplified by U.S. Patent No. 2011/0101056 to Barkey and U.S. Patent Application Publication No. 2014/0069971 to Van Kaathoven. The problem with these systems is that their presence often prevents the easy removal or application of the roofing system. Also, such prior art systems tend to adversely alter the aesthetics and aerodynamics of the vehicle. This can lead to a substantially reduced gas mileage rating for the vehicle.

A need therefore exists for a roof rack system for vehicles with removable or retractable roofs, wherein the roof rack system transfers loads to the framework of the vehicle without adversely affecting the functionality of the existing roofing system. A need also exists for a roof rack system that does not detract from the overall aesthetics and aerodynamics of the vehicle. These needs are met by the present invention as described and claimed below.

SUMMARY OF THE INVENTION

The present invention is a vehicle structure. The vehicle has a framework that consists of a driver side frame element, a passenger side frame element and possible roll bars. An open area is interposed between the driver side frame element and the passenger side frame element. The vehicle has a roof system that can be closed and opened or removed to selectively cover and expose the open area. When the roof system is closed, a gap space exists between the open area and the interior of the roof system.

Removable mounts are bolted to the framework. At least two cargo bars are provided that attach to the mounts. The cargo bars extend across the open area and are supported by the mounts in the gap space under the roof system. In this manner, the roof system can be selectively opened and closed over the cargo bars. When the roof of the vehicle is open, the cargo bars are exposed. A plurality of mounting accessories can be selectively attached to the exposed cargo bars. The mounting accessories can have different shapes for holding a variety of items.

BRIEF DESCRIPTION OF THE DRAWINGS

For a better understanding of the present invention, reference is made to the following description of exemplary embodiments thereof, considered in conjunction with the accompanying drawings, in which:

FIG. 3 is a top view of a first cargo bar from the exemplary roof rack;

FIG. 4 is a front view of a first cargo bar and mount from the exemplary roof rack;

DETAILED DESCRIPTION OF THE DRAWINGS

Although the present invention vehicle structure can be adapted for use in many types of sports utility vehicles, cars and pickup trucks that have removable or retractable roof systems, the system is especially well suited for use on a convertible sports utility vehicle, such as a Jeep® Wrangler® or a Ford® Bronco®. Accordingly, the present invention system is presented in an exemplary embodiment where it is configured for use on a sports utility vehicle. The illustrated embodiment is selected in order to set forth one of the best modes contemplated for the invention. However, the illustrated vehicle is intended to be representative of any vehicle that has a retractable or removable roof. The illustrated embodiment is merely exemplary and should not be considered a limitation when interpreting the scope of the appended claims.

Figure 1:
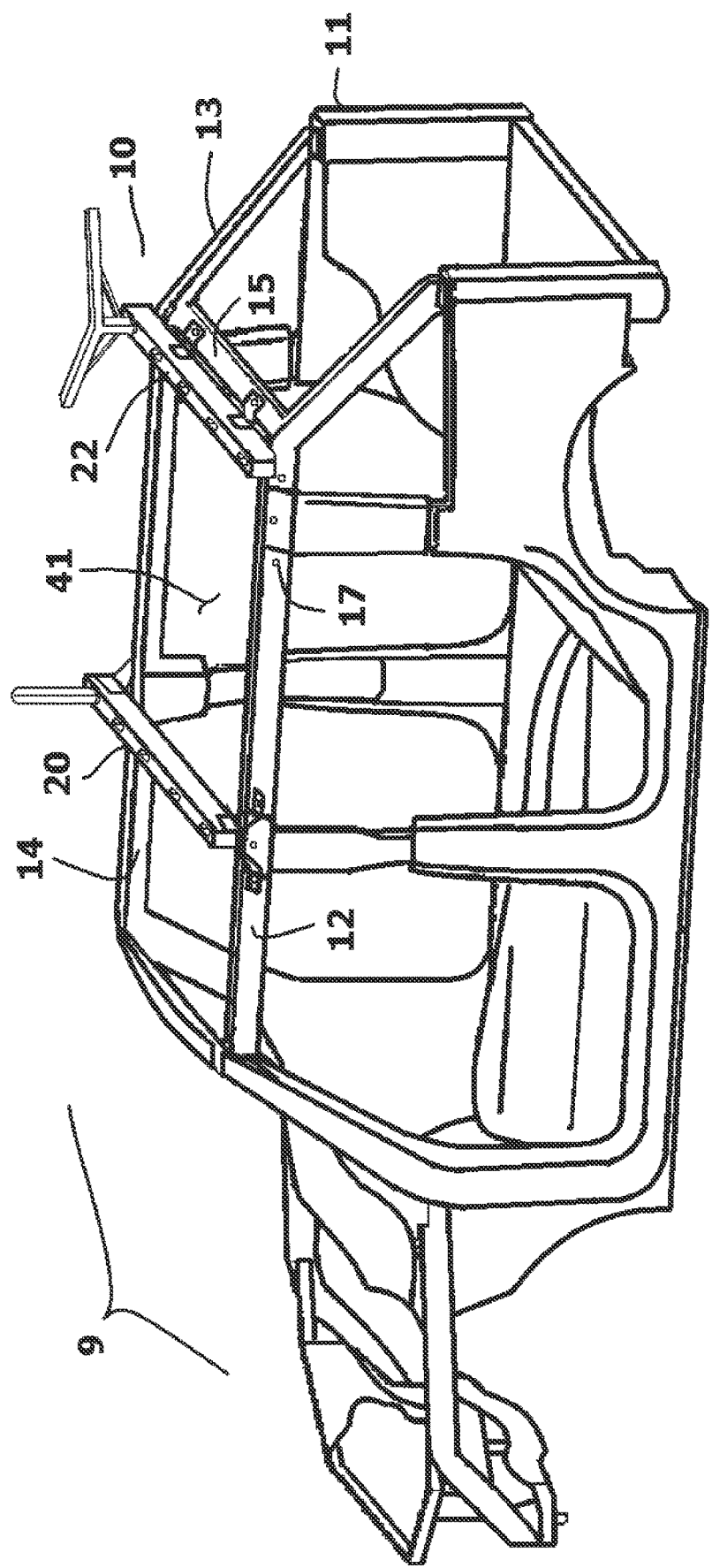
FIG. 1 is a perspective view of an exemplary embodiment of a vehicle system having a roof rack applied to the upper framework of a sports utility vehicle.
Figure 2:
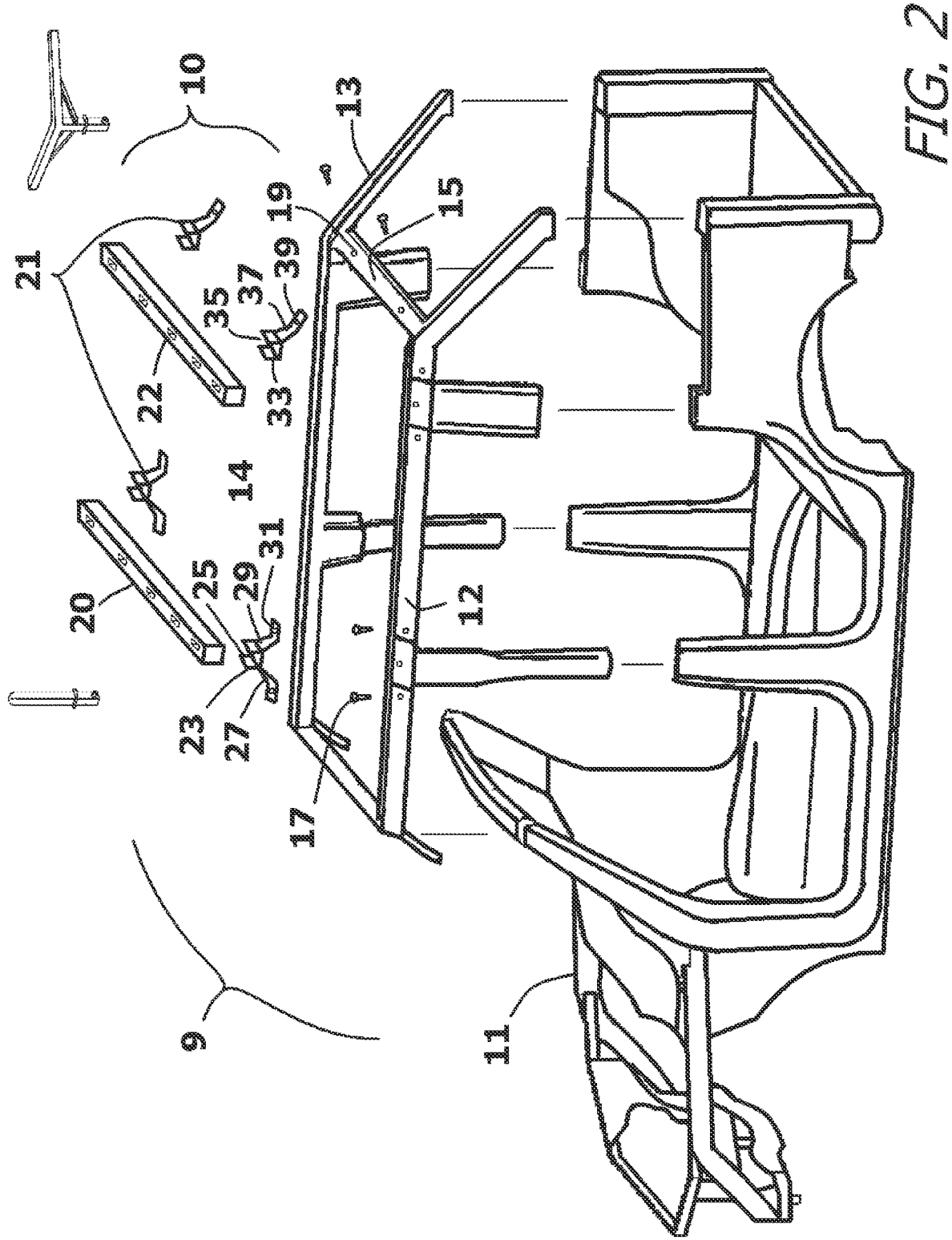
FIG. 2 is the embodiment as FIG. 1 with the roof rack shown in an exploded perspective.

Referring to FIG. 1 and FIG. 2, a vehicle structure 9 with a roof rack system 10 is shown in conjunction with an exemplary embodiment of a frame for a sports utility vehicle 11. In particular, a modern model of the Ford® Bronco® is shown. Such a sports utility vehicle 11 has an upper framework 13 with a driver side frame element 12 and a passenger side frame element 14. One or more lateral crossbars 15 may cross between the driver side frame element 12 and the passenger side frame element 14, depending upon the make, model and year of the sports utility vehicle 11. The driver side frame element 12, the passenger side frame element 14 and the lateral crossbars 15 all contain various removable bolts 17 and threaded holes 19. The removable bolts 17 hold various vehicle components in place, such as body panels and trim. The threaded holes 19 are for use in attaching a roofing system to the sports utility vehicle 11. The locations of the removable bolts 17 and the threaded holes 19 vary depending upon the make, model and year of the sports utility vehicle 11.

Mounts 21 of specific shapes are provided. The configurations of the mounts 21 depend upon the make, model and year of the vehicle 11. In the illustrated embodiment, two types of mounts 21 are shown. The first type of mount 21 is a dual-point mount 23. The dual-point mount 23 has a single bar receptacle 25 that is supported by two brackets 27, 29. The brackets 27, 29 can be symmetrically or asymmetrically formed. Both brackets 27, 29 have bolt holes 31 that enable the brackets 27, 29 to be bolted to the upper framework 13 of the sports utility vehicle 11. Since the dual-point mount 23 has two brackets 27, 29, the dual-point mount 23 attaches to the upper framework 13 of the vehicle 11 at two distinct points. The brackets 27, 29 are shaped and sized so that the bolt holes 21 on the brackets 27, 29 align with either the removable bolts 17 or the threaded holes 19 on the upper framework 13 of the sports utility vehicle 11.

The second type of mount 21 is a single-point mount 33. The single-point mount 33 has a bar receptacle 35 that is supported by a single bracket 37. The bracket 37 has a bolt hole 39 that enables the bracket 37 to be bolted to the upper framework 13 of the sports utility vehicle 11. Since the single-point mount 33 has only one bracket 37, the single-point mount 33 attaches to the upper framework 13 of the sports utility vehicle 11 at one point. The bracket 37 is shaped and sized so that the bolt hole 39 on the bracket 37 aligns with either a removable bolt 17 or a threaded hole 19 on the upper framework 13 of the sports utility vehicle 11.

Both the dual-point mount 23 and the single-point mount 33, respectively, support bar receptacles 25, 35. The bar receptacles 25, 35 are configured to receive and retain cargo bars 20, 22. The roof rack system 10 of the present invention includes two cargo bars 20, 22. In the sports utility vehicle 11, there is an open area 41 between the driver side frame element 12 and the passenger side frame element 14. The cargo bars 20, 22 extend laterally across the open area 41. The cargo bars 20, 22 are held in position by the dual-point and/or the single-point mounts 23, 33. When mounted, the cargo bars 20, 22 are parallel or near parallel. Furthermore, the cargo bars 20, 22 are held at an elevation between one inch and four inches above the upper framework 13 of the vehicle 11, where the two cargo bars 20, 22 serve as two low-profile roof racks.

Referring to FIG. 3 and FIG. 4 in conjunction with FIG. 1 and FIG. 2, it can be seen that the first cargo bar 20 has a first end 24 and an opposite second end 26. The first cargo bar 20 is preferably straight between the first end 24 and the second end 26. The length between the first end 24 and the second end 26 depends upon the make, model and year of the sports utility vehicle 11, wherein the first cargo bar 20 must fit under the roofing system of the vehicle 11.

In the illustrated embodiment, the first cargo bar 20 has a square cross-sectional profile. However, it will be understood that the first cargo bar 20 can be round, rectangular, or have any other cross-sectional shape that provides structural integrity. Regardless of the selected cross-sectional shape, the first cargo bar 20 has a top surface 28 and an opposite bottom surface 30. When mounted to a sports utility vehicle 11, the bottom surface 30 of the first cargo bar 20 faces toward the sports utility vehicle 11 and the top surface 28 faces vertically away from the sports utility vehicle 11.

A plurality of shaped openings 32 are formed in the first cargo bar 20 along its length. There is a shaped opening 32 positioned at both the first end 24 of the first cargo bar 20 and at the second end 26 of the first cargo bar 20. The remaining shaped openings 32 are interposed periodically between the first end 24 and the second end 26. The number and spacing of the shaped openings 32 is a matter of design choice but is preferably greater than one.

In the illustrated embodiment, each of the shaped openings 32 is merely a shaped hole that passes through the structure of the first cargo bar 20 from the top surface 28 to the bottom surface 30. Such a construction is merely exemplary. The shaped openings 32 need not pass through the first cargo bar 20. Rather, shaped openings in the form of short open-ended tubes can be affixed to the sides of the first cargo bar 20, if preferred, as an alternative.

Figure 5:
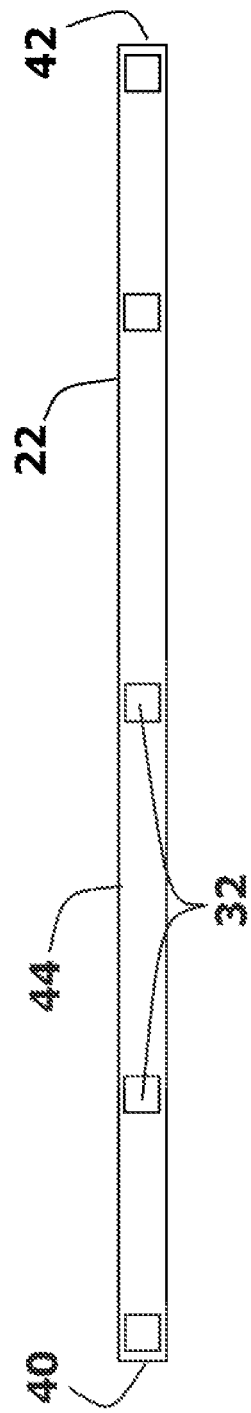
FIG. 5 is a top view of a second cargo bar from the exemplary roof rack.
Figure 6:
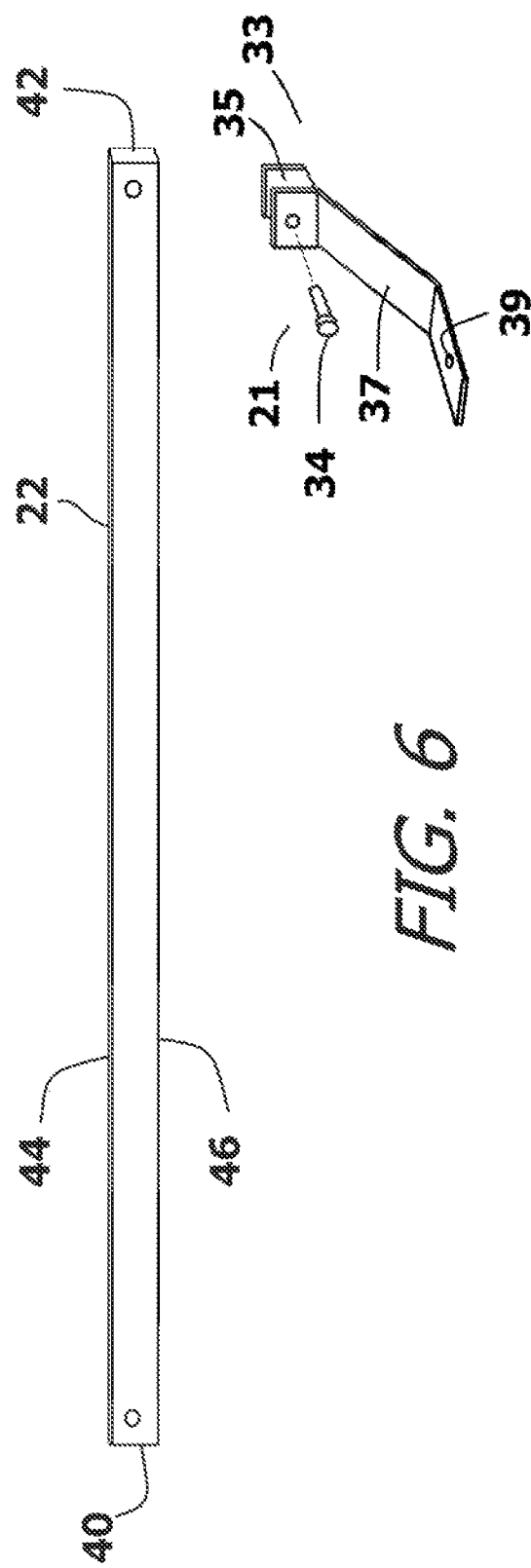
FIG. 6 is a front perspective view of a second cargo bar and mount from the exemplary roof rack.

Referring to FIG. 5 and FIG. 6 in conjunction with FIG. 1 and FIG. 2, it can be seen that the second cargo bar 22 has a first end 40 and an opposite second end 42. The second cargo bar 22 is preferably straight between the first end 40 and the second end 42. In the illustrated embodiment, the second cargo bar 22 has a square cross-sectional profile. However, it will be understood that the second cargo bar 22 can be round, rectangular or have any other cross-sectional shape. Regardless of the selected cross-sectional shape, the second cargo bar 22 has a top surface 44 and an opposite bottom surface 46. When mounted to a sports utility vehicle 11, the bottom surface 46 of the second cargo bar 22 faces toward the sports utility vehicle 11 and the top surface 44 faces vertically away from the sports utility vehicle 11.

A plurality of shaped openings 32 are formed along the length of the second cargo bar 22. The shaped openings 32 on the second cargo bar 22 are the same as the shaped openings 32 on the first cargo bar 20, thus the same reference number is used. There is a shaped opening 32 near both the first end 40 and the second end 42 of the second cargo bar 22. The remaining shaped openings 32 are interposed periodically between the first end 40 and the second end 42. The number and spacing of the shaped openings 32 is a matter of design choice but is preferably greater than one.

In the illustrated embodiment, each of the shaped openings 32 is merely a hole that passes through the structure of the second cargo bar 22 from the top surface 44 to the bottom surface 46. Such a construction is merely exemplary. The shaped openings 32 need not pass through the second cargo bar 22. Rather, alternate shaped openings, in the form of short tubes, can be affixed to the sides of the second cargo bar 22.

With reference to FIG. 4 and FIG. 6, it will be understood that the first end 24 and the second end 26 of the first cargo bar 20 are shaped and sized to be received by the bar receptacles 25, 35 of the mounts 21. Likewise, the first end 40 and the second end 42 of the second cargo bar 22 are shaped and sized to be received by the bar receptacles 25, 35 of the mounts 21. The cargo bars 20, 22 are locked into the bar receptacles 25, 35 of the mounts 21 using mechanical fasteners 34, such as bolts or locking pins.

Figure 7:
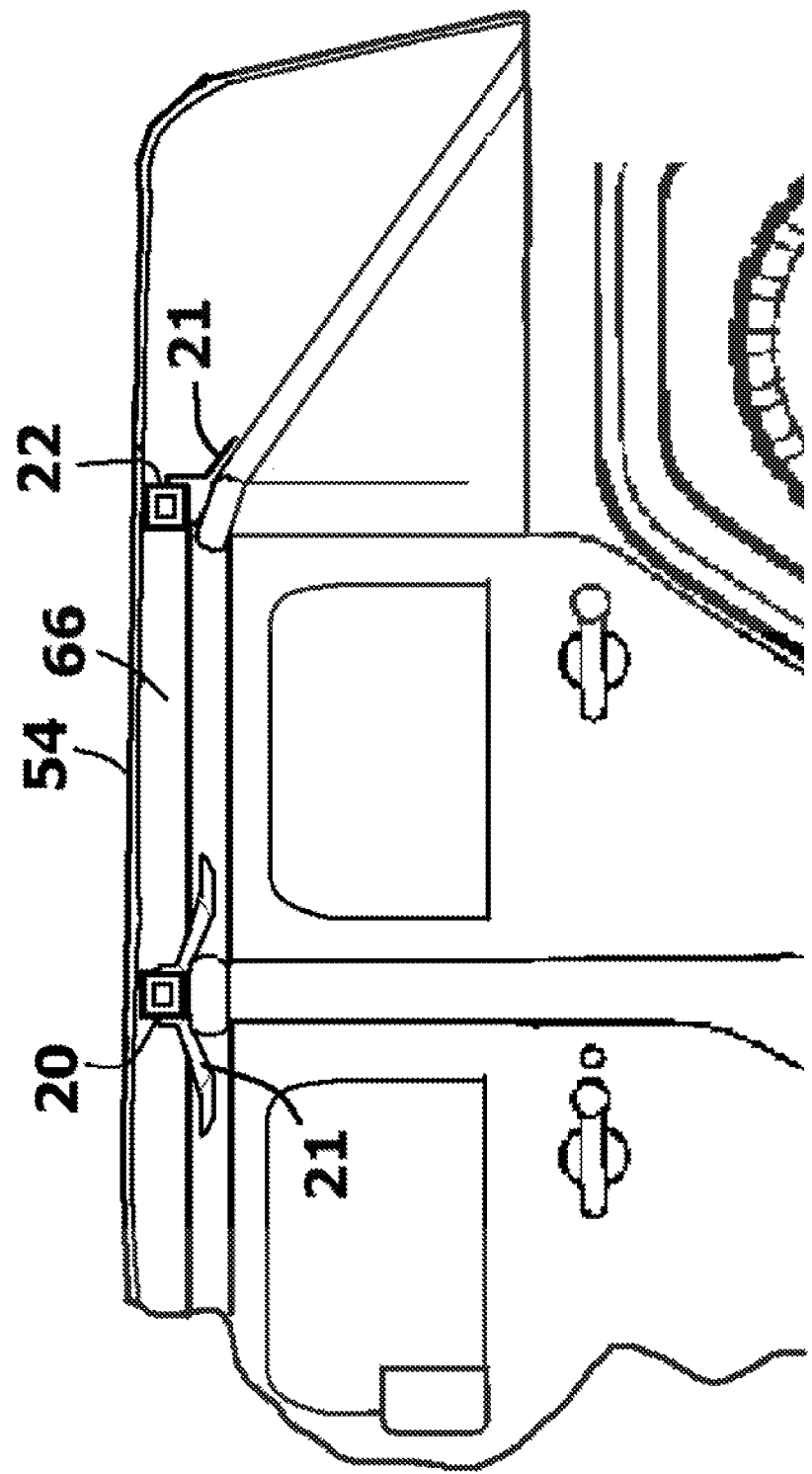
FIG. 7 is a partially fragmented view of the roof rack assembly installed under a soft top roof of a sports utility vehicle.

Referring to FIG. 7, it will be understood that the sports utility vehicle 11 has a roof system 54. When the roof system 54 is installed and closed, a gap space 66 occurs between the roof system 54 and the open area 41 between the driver side frame element 12 and the passenger side frame element 14. When the first cargo bar 20 and the second cargo bar 22 are attached to the sports utility vehicle 11, the two cargo bars 20, 22 are parallel and are oriented in a common horizontal plane. Furthermore, the two cargo bars 20, 22 are very closely positioned above the upper framework 13. The cargo bars 20, 22 have a preferred thickness of under one inch. The mounts 21 are only high enough to enable the cargo bars 20, 22 to clear the upper framework 13. The combined height of the mounts 21 and cargo bars 20, 22 is smaller than the gap space 66 that occurs under the closed roof system 54. As a consequence, both the cargo bars 20, 22 are positioned in the gap space 66 under the roof system 54. The cargo bars 20, 22, therefore, can remain mounted in place, without effecting the ability to close the roof system 54 over the cargo bars 20, 22. The roof system 54 can, therefore, be opened and closed in a traditional manner with the cargo bars 20, 22 set in place.

Referring to FIG. 1 in conjunction with FIG. 2 and FIG. 7, it will be understood that in order to utilize the roof rack system 10, the mounts 21 are selected and are bolted to the upper framework 13. The mounts 21 selected depend upon the make, model and year of the sports utility vehicle 11. The mounts 21 align with removable bolts 17 and/or threaded holes 19 on the upper framework 13. If the mounts 21 align with removable bolts 17, the removable bolts 17 are removed. The removable bolts 17 or slightly longer replacement bolts are then used to attach the mounts 21 to the upper framework 13. If the mounts 21 align with threaded holes 19, then auxiliary bolts 51 are provided that can engage the threaded holes 19 through the mounts 21. Once the mounts 21 are bolted in place, the cargo bars 20, 22 are attached to the mounts 21. Each of the cargo bars 20, 22 contain shaped openings 32. The shaped openings 32 are the same on both the first cargo bar 20 and the second cargo bar 22.

Figure 8:
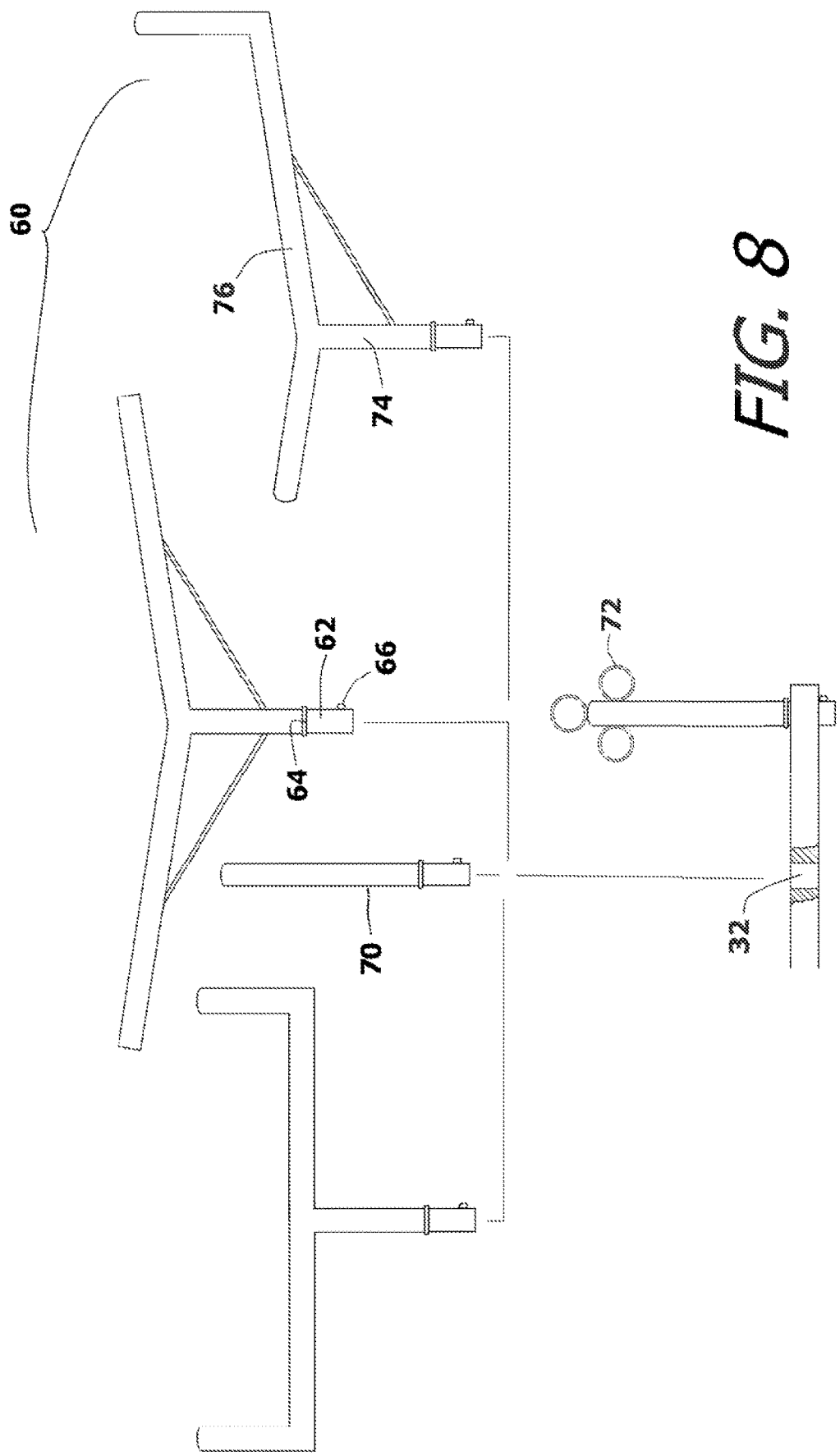
FIG. 8 is a front view of the exemplary mounting accessories shown with a fragmented cargo bar.

Referring to FIG. 8, it can be seen that a plurality of mounting accessories 60 are available, wherein each of the mounting accessories 60 can be attached to any of the shaped openings 32. All of the mounting accessories 60 have a common connector 62. The connector 62 can pass into any shaped opening 32. The connector 62 has a shape that can be received in the shaped opening 32. There is a stop 64 formed on the connector 62 to limit the passing of the connector 62 into a shaped opening 32. A locking mechanism 68, such as a detent, is provided to prevent each connector 62 from inadvertently exiting a shaped opening 32.

The mounting accessories 60 can have many specialized configurations for specialized purposes. The simplest of the mounting accessories 60 is a post 70. The post 70 extends vertically from any of the shaped openings 32 on the cargo bars 20, 22. The posts 70 can have any lengths. Additionally, posts 70 can have loops 72 to help with the attachment of ropes and other strapping elements. Additionally, mounting plates that can be bolted onto other roof top accessories, such as roof top tents.

Mounting accessories 60 can also be specialized for specific carrier tasks, such as kayak carriers, bicycle carriers and the like. Such specialized mounting accessories 60 have shaped openings coupled to a shaft 74. The shaft 74 elevates a U-shaped frame or some other yoke 76 that is specifically sized and shaped to hold a particular item. Since the shaped openings 32 are located on the cargo bars 20, 22 at periodic points, the mounting accessories 60 can be positioned to customize the roof rack system 10 to the particular shape and size of the load being carried.

Referring now to all figures, it will be understood that in order to use the roof rack system 10, the open area 41 on the sports utility vehicle 11 is exposed. This may involve retracting or removing a roof 54 system. Once exposed, the mounts 21 and cargo bars 20, 22 are attached. If not immediately needed to carry a load, the soft top roof 54 can be closed directly over the mounts 21 and the cargo bars 20, 22.

When a load is to be carried, the cargo bars 20, 22 are again exposed by retracting the roof system 54. Mounting accessories 60 are selected for the load and are inserted into the appropriate shaped openings 32 on the cargo bars 20, 22. The load is then tied in place using traditional strapping. The cargo bars 20, 22 transfer the weight of the load directly to the upper framework 13 of the sports utility vehicle 11. Once the load is transported and unloaded, the mounting accessories 60 can be removed and stored. The cargo bars 20, 22 can remain in place as the roof system 54 is deployed.

It will be understood that the embodiments of the present invention that are illustrated and described are merely exemplary and that a person skilled in the art can make many variations to these embodiments. All such embodiments are intended to be included within the scope of the present invention as defined by the claims.

What is claimed is:

1. A vehicle structure comprising:
   an upper framework having a driver side frame element, a passenger side frame element and at least one lateral element that extends between said driver side frame element and said passenger side frame element, wherein an open area is interposed between said driver side frame element and said passenger side frame element;
   a roof system for selectively covering and exposing said open area, wherein a gap space exists between said open area and said roof system when said roof system covers said open area;
   mounting brackets attached to said upper framework with removable mechanical fasteners;
   cargo bars attached to said mounting brackets, wherein said cargo bars traverse said open area in parallel and at a common elevation within said gap space under said roof system when said roof system covers said open area.

2. The vehicle structure according to claim 1, wherein at least one of said mounting brackets mounts to said at least one lateral element.

3. The vehicle structure according to claim 1, wherein said cargo bars are in a common plane in said gap space.

4. The vehicle structure according to claim 1, wherein each of said cargo bars supports a plurality of shaped openings.

5. The vehicle structure according to claim 4, wherein each of said cargo bars has a first end, an opposite second end, a top surface and an opposite bottom surface, wherein more than two of said plurality of shaped openings are symmetrically spaced between said first end and said second end.

6. The vehicle structure according to claim 4, further including mounting accessories that are received by said plurality of shaped openings.

7. The vehicle structure according to claim 6, wherein said mounting accessories are varied in shape and are interchangeable in connecting to said plurality of shaped openings.

8. The vehicle structure according to claim 7, wherein said mounting accessories include vertical shafts and at least one lateral arm that extends from said vertical shaft.

9. A vehicle structure comprising:
an upper framework having a first side frame element, a second side frame element and an open area interposed between said first side frame element and said second side frame element;
a roof that selectively covers said open area, wherein a gap space exists between said open area and said roof when said roof covers said open area;
mounting accessories;
cargo bars, wherein each of said cargo bars contains a plurality of openings that receive and retain said mounting accessories; and
mounting brackets attached to said upper framework with removable mechanical fasteners, wherein said cargo bars are attached in parallel to said mounting brackets and wherein said cargo bars are held at a common elevation in said gap space under said roof when said roof covers said open area.

10. The vehicle structure according to claim 9, wherein said upper framework includes at least one lateral crossbar that extends between said first side frame element and said second side frame element.

11. The vehicle structure according to claim 9, wherein each of said plurality of openings has a uniform shape.

* * * * *